US012602547B2

(12) United States Patent (10) Patent No.: US 12,602,547 B2
Agarwal et al. (45) Date of Patent: Apr. 14, 2026

(54) DOMAIN ADAPTING GRAPH NETWORKS FOR VISUALLY RICH DOCUMENTS

(71) Applicant: Oracle International Corporation, Redwood Shores, CA (US)

(72) Inventors: Amit Agarwal, Kolkata (IN); Srikant Panda, Bangalore (IN); Deepak Karmakar, Seraikella (IN); Kulbhushan Pachauri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 186 days.

(21) Appl. No.: 18/240,480

(22) Filed: Aug. 31, 2023

(65) Prior Publication Data

US 2024/0289551 A1 Aug. 29, 2024

(51) Int. Cl.
G06F 40/284 (2020.01)
(52) U.S. Cl.
CPC .................................. G06F 40/284 (2020.01)
(58) Field of Classification Search
CPC .......... G06N 3/045; G06N 3/08; G06F 16/35; G06F 40/284
See application file for complete search history.

(56) References Cited

U.S. PATENT DOCUMENTS 9,424,668 B1    8/2016   Petrou et al.
11,087,081 B1   8/2021   Srivastava et al.
11,341,367 B1   5/2022   Barbosa et al.
11,823,478 B2   11/2023  Agarwal et al.
(Continued)

FOREIGN PATENT DOCUMENTS

CN    107977345 A    5/2018
CN    113936340 A    1/2022
(Continued)

OTHER PUBLICATIONS

Yu et al, (2020), "PICK: Processing Key Information Extraction from Documents using Improved Graph Learning-Convolutional Networks", (Year: 2020).*
(Continued)

*Primary Examiner* — Angela A Armstrong
(74) *Attorney, Agent, or Firm* — Kilpatrick Townsend & Stockton LLP

(57) ABSTRACT

In some implementations, techniques described herein may include identifying text in a visually rich document and determining a sequence for the identified text. The techniques may include selecting a language model based at least in part on the identified text and the determined sequence. Moreover, the techniques may include assigning each word of the identified text to a respective token to generate textual features corresponding to the identified text. The techniques may include extracting visual features corresponding to the identified text. The techniques may include determining positional features for each word of the identified text. The techniques may include generating a graph representing the visually rich document, each node in the graph representing each of the visual features, textual features, and positional features of a respective word of the identified text. The techniques may include training a classifier on the graph to classify each respective word of the identified text.

14 Claims, 12 Drawing Sheets

(56) References Cited

U.S. PATENT DOCUMENTS

| 11,989,964 | B2 | 5/2024 | Agarwal et al. | |
| 12,106,595 | B2 | 10/2024 | Agarwal et al. | |
| 12,182,498 | B1 * | 12/2024 | Sunkara | G10L 15/16 |
| 2012/0062574 | A1 | 3/2012 | Dhoolia et al. | |
| 2016/0364608 | A1 * | 12/2016 | Sengupta | G06V 30/414 |
| 2020/0125954 | A1 | 4/2020 | Truong et al. | |
| 2020/0380623 | A1 * | 12/2020 | Ranjan | G05B 15/02 |
| 2020/0410231 | A1 | 12/2020 | Chua et al. | |
| 2021/0089587 | A1 | 3/2021 | Gupta et al. | |
| 2021/0133645 | A1 | 5/2021 | Tazi et al. | |
| 2021/0158093 | A1 | 5/2021 | Kaynig-Fittkau et al. | |
| 2021/0248323 | A1 | 8/2021 | Maheshwari et al. | |
| 2022/0092267 | A1 | 3/2022 | Hou et al. | |
| 2022/0171938 | A1 | 6/2022 | Jalaluddin et al. | |
| 2023/0146501 | A1 | 5/2023 | Agarwal et al. | |
| 2023/0153335 | A1 | 5/2023 | Mcneill | |
| 2023/0326224 | A1 | 10/2023 | Agarwal et al. | |
| 2023/0394235 | A1 * | 12/2023 | Rahman | G06F 40/242 |

FOREIGN PATENT DOCUMENTS

| CN | 114491010 | A | 5/2022 |
| WO | 2022078922 | A1 | 4/2022 |

OTHER PUBLICATIONS

U.S. Appl. No. 18/379,091, "Non-Final Office Action", mailed Jun. 6, 2024, 19 pages.
U.S. Appl. No. 18/379,091, "Notice of Allowability", mailed Aug. 14, 2024, 4 pages.
U.S. Appl. No. 18/379,091, "Notice of Allowance", mailed Jul. 29, 2024, 7 pages.
International Application No. PCT/US2024/016876, "International Search Report and Written Opinion", mailed Jun. 5, 2024, 16 pages.
Tang et al., "MatchVIE: Exploiting Match Relevancy between Entities for Visual Information Extraction", Available online at: https://arxiv.org/pdf/2106.12940, Jun. 24, 2021, 7 pages.
Wei et al., "Robust Layout-Aware IE for Visually Rich Documents with Pre-Trained Language Models", Cornell University Library, Available online at: https://arxiv.org/pdf/2005.11017, May 22, 2020, 10 pages.
Xu et al., "LayoutLMv2: Multi-Modal Pre-Training for Visually-Rich Document Understanding", Available Online at: https://arxiv.org/pdf/2012.14740v4, Jan. 10, 2022, 13 pages.
"Augmentation Pipeline for Rendering Synthetic Paper Printing, Faxing, Scanning and Copy Machine Processes", Available Online at: https://github.com/sparkfish/augraphy, Accessed from Internet on Apr. 4, 2022, pp. 1-13.
"BERT", Available Online at: https://huggingface.co/docs/transformers/model_doc/bert, Accessed from Internet on Mar. 2, 2022, 114 pages.
"DataGen—CeDar", Centre for Applied Data Analytics Research, Available Online at: https://old.ceadar.ie/wp-content/uploads/CeADAR_Flyer_DataGen_v2.pdf, 1 page.
"Datagen Synthetic Image Datasets for Computer Vision", Available Online at: https://datagen.tech/, Accessed from Internet on Jun. 1, 2022, pp. 1-6.
"Deterministic Algorithm", Wikipedia, Available Online at: https://en.wikipedia.org/wiki/Deterministic_algorithm, Accessed from Internet on Mar. 2, 2022, 4 pages.
"DistilBERT", Available Online at: https://huggingface.co/docs/transformers/model_doc/distilbert, Accessed from Internet on Mar. 2, 2022, 62 pages.
"LayoutLMFT", Available online at https://github.com/microsoft/unilm/tree/master/layoutlmft, Accessed from Internet on Aug. 19, 2021, 2 pages.
"Public Leader for SROIE", Available online at https://rrc.cvc.uab.es/?ch=13&com=evaluation&task=3, Accessed from Internet on: Aug. 19, 2021, 5 pages.
"Scipy.Optimize.Linear_Sum_Assignment", Available Online at: https://docs.scipy.org/doc/scipy-0.18.1/reference/generated/scipy.optimize.linear_sum_assignment.html, Sep. 19, 2016, 2 pages.
"Sklearn.Decomposition.PCA", Available Online at: https://scikit-learn.org/stable/modules/generated/sklearn.decomposition.PCA.html, Accessed from Internet on Mar. 2, 2022, 6 pages.
"Spaczz: Fuzzy Matching and More for Spacy", Available Online at: https://github.com/gandersen101/spaczz, Accessed from Internet on Mar. 2, 2022, 20 pages.
"Text Distance", Available Online at: https://github.com/life4/textdistance, Accessed from Internet on Mar. 2, 2022, 9 pages.
"Welcome to Albumentations Documentation", Available Online at: https://albumentations.ai/docs/, Accessed from Internet on Apr. 4, 2022, pp. 1-3.
"WordNet: A Lexical Database for English", Princeton University, Available Online at: https://wordnet.princeton.edu/, Accessed from Internet on Mar. 2, 2022, 4 pages.
U.S. Appl. No. 17/714,806, "Notice of Allowance", mailed Jun. 22, 2023, 14 pages.
U.S. Appl. No. 17/714,806, "Notice of Allowance", mailed Jul. 26, 2023, 7 pages.
Abdelzad et al., "Detecting Out-of-Distribution Inputs in Deep Neural Networks Using an Early-Layer Output", Available Online at: https://arxiv.org/pdf/1910.10307.pdf, Oct. 23, 2019, 15 pages.
Ba, "Meta-data Driven Key-Value Pairs Extraction with Azure Form Recognizer", Available Online at: https://techcommunity.microsoft.com/t5/ai-cognitive-services-blog/meta-data-driven-key-value-pairs-extraction-with-azure-form/ba-p/1942595, Nov. 30, 2020, 8 pages.
Biswas et al., "DocSynth: A Layout Guided Approach for Controllable Document Image Synthesis", Available Online at: https://arxiv.org/pdf/2107.02638.pdf, Jul. 6, 2021, pp. 1-15.
Brems, "A One-Stop Shop for Principal Component Analysis", Towards Data Science, Available Online at: https://towardsdatascience.com/a-one-stop-shop-for-principal-component-analysis-5582fb7e0a9c, Apr. 18, 2017, 14 pages.
Chogovadze et al., "Controllable Data Augmentation Through Deep Relighting", Available Online at: https://arxiv.org/pdf/2110.13996.pdf, Oct. 26, 2021, pp. 1-15.
Delalandre et al., "Generation of Synthetic Documents for Performance Evaluation of Symbol Recognition & Spotting Systems.", International Journal on Document Analysis and Recognition, vol. 13, No. 3, Sep. 2010, pp. 187-207.
Devlin et al., "BERT: Pre-training of Deep Bidirectional Transformers for Language Understanding", Available Online at: https://arxiv.org/pdf/1810.04805.pdf, May 24, 2019, 16 pages.
Gautam, "Form Data Augmentation: Repository for Augmenting Data in Forms, Invoices and Receipts for Document Image Understanding", Available Online at: https://github.com/gautam-aayush/form-data-augmentation, Mar. 19, 2021, pp. 1-11.
Ghosh, "Invoice Information Extraction Using OCR and Deep Learning", Available Online at: https://medium.com/analytics-vidhya/invoice-information-extraction-using-ocr-and-deep-learning-b79464f54d69, Jan. 14, 2021, 31 pages.
Huang et al., "Out-of-Distribution Detection for LiDAR-based 3D Object Detection", Available Online at: https://arxiv.org/pdf/2209.14435v1.pdf, Sep. 28, 2022, 7 pages.
Jaadi, "A Step-by-Step Explanation of Principal Component Analysis (PCA)", Builtin.com, Available Online at: https://builtin.com/data-science/step-step-explanation-principal-component-analysis, Apr. 1, 2021, 8 pages.
Journet et al., "DocCreator: A New Software for Creating Synthetic Ground-Truthed Document Images", Journal of Imaging, vol. 3, Available Online at: https://hal.archives-ouvertes.fr/hal-01668915/file/jimaging.pdf, Dec. 2017, pp. 1-17.
Lin et al., "An Efficient Data Augmentation Network for Out-of-Distribution Image Detection", IEEE Access, vol. 9, Feb. 24, 2021, pp. 35313-35323.
Liu et al., "Self-Supervised Learning: Generative or Contrastive", Available online at https://arxiv.org/pdf/2006.08218.pdf, Mar. 20, 2021, pp. 1-24.
Luan et al., "Out-Of-Distribution Detection for Deep Neural Networks with Isolation Forest and Local Outlier Factor", Available

(56)                    References Cited

OTHER PUBLICATIONS

Online at: https://www.researchgate.net/publication/354189192_Out-Of-Distribution_Detection_for_Deep_Neural_Networks_with_Isolation_Forest_and_Local_Outlier_Factor, Aug. 27, 2021, 13 pages.
Ma, "NLP Augmentation", Available online at: https://github.com/makcedward/nlpaug, 2019, 4 pages.
Ma, "nlpaug: Data Augmentation for NLP", Available Online at: https://github.com/makcedward/nlpaug, Accessed from Internet on Apr. 4, 2022, 21 pages.
Moore et al., "Hungarian Maximum Matching Algorithm", Brilliant Math & Science Wiki, Available Online at: https://brilliant.org/wiki/hungarian-matching/, Accessed from Internet on Mar. 2, 2022, 7 pages.
Moore et al., "Matching (Graph Theory)", Brilliant Math & Science Wiki, Available Online at: https://brilliant.org/wiki/matching/, Accessed from Internet on Mar. 2, 2022, 6 pages.
Moore et al., "Matching Algorithms (Graph Theory)", Brilliant Math & Science Wiki, Available Online at: https://brilliant.org/wiki/matching-algorithms/, Accessed from Internet on Mar. 2, 2022, 5 pages.
Rawat et al., "PnPOOD : Out-Of-Distribution Detection for Text Classification via Plug and Play Data Augmentation", Available Online at: https://arxiv.org/abs/2111.00506, Oct. 31, 2021, 9 pages.
Ronneberger et al., "U-Net: Convolutional Networks for Biomedical Image Segmentation", International Conference on Medical Image Computing and Computer-Assisted Intervention, Available Online at URL: https://arxiv.org/pdf/1505.04597.pdf, May 18, 2015, pp. 234-241.
Sebastianelli et al., "Automatic Dataset Builder for Machine Learning Applications to Satellite Imagery", Software X, vol. 15, Jul. 2021, 7 pages.
Sun et al., "Spatial Dual-Modality Graph Reasoning for Key Information Extraction", Journal of Latex Class Files, vol. 14, No. 8, Available online at https://arxiv.org/pdf/2103.14470.pdf, Aug. 2015, pp. 1-9.
Van Laer , "Recognition of Named Entities on Invoices for IxorDocs", Available Online at: https://medium.com/ixorthink/recognition-of-named-entities-on-invoices-for-ixordocs-9bef38d24429, Aug. 2, 2018, 14 pages.
Veyseh et al., "Improving Keyphrase Extraction with Data Augmentation and Information Filtering", Available Online at: https://www.researchgate.net/publication/363501653_Improving_Keyphrase_Extraction_with_Data_Augmentation_and_Information_Filtering, Sep. 11, 2022, 10 pages.
White , "By 2024, 60% of the Data Used for the Development of AI and Analytics Projects Will Be Synthetically Generated", Available Online at: https://blogs.gartner.com/andrew_white/2021/07/24/by-2024-60-of-the-data-used-for-the-development-of-ai-and-analytics-projects-will-be-synthetically-generated/, Jul. 24, 2021, pp. 1-4.
Xu et al., "LayoutLM: Pre-Training of Text and Layout for Document Image Understanding", Available Online at: https://arxiv.org/pdf/1912.13318.pdf, Aug. 23-27, 2020, 9 pages.
You et al., "Graph Contrastive Learning with Augmentations", 34th Conference on Neural Information Processing Systems, Available online at https://papers.nips.cc/paper/2020/file/3fe230348e9a12c13120749e3f9fa4cd-Paper.pdf, 2020, pp. 1-12.
Yu et al., "PICK: Processing Key Information Extraction from Documents using Improved Graph Learning-Convolutional Networks", arXiv:2004.07464, Available Online at: https://arxiv.org/pdf/2004.07464.pdf, Jul. 18, 2020, 8 pages.
U.S. Appl. No. 17/524,157, "Notice of Allowance", mailed Feb. 28, 2024, 24 pages.

* cited by examiner

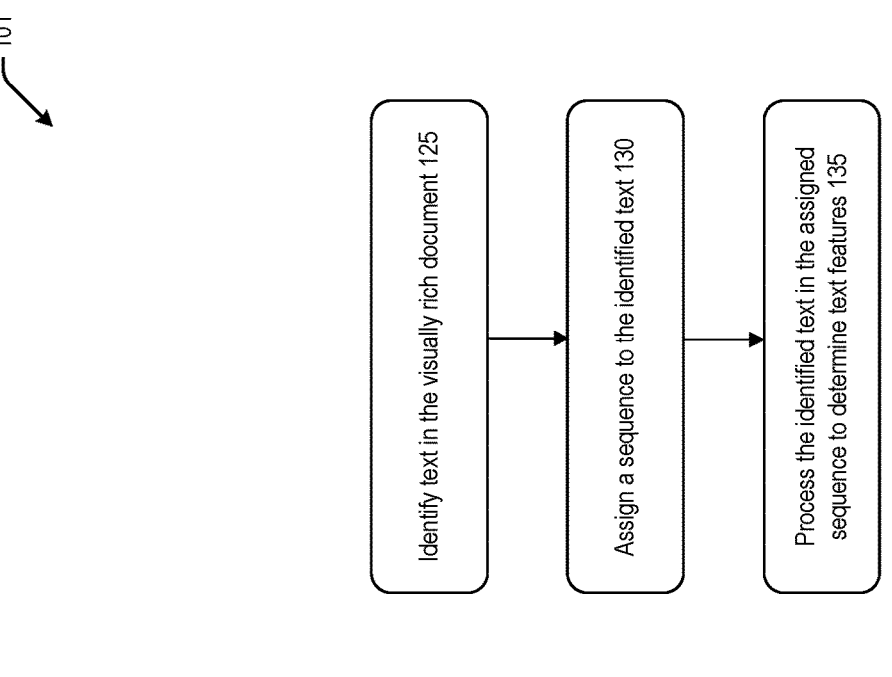
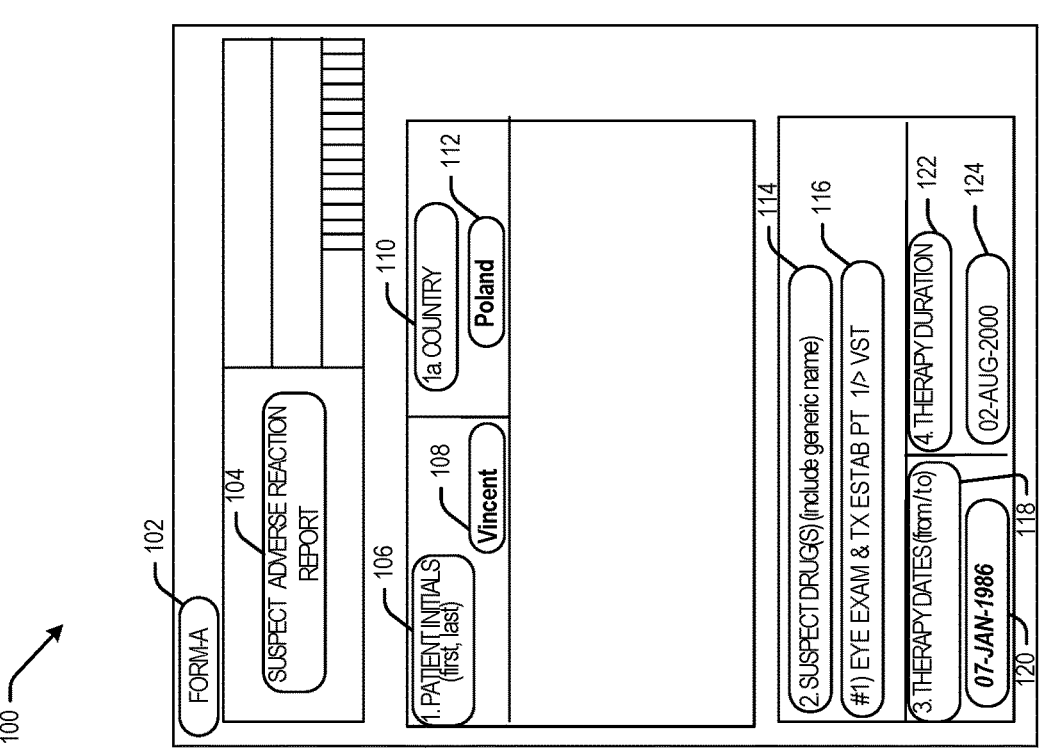
FIG. 1

● Support vector machines

● Neural nets

500

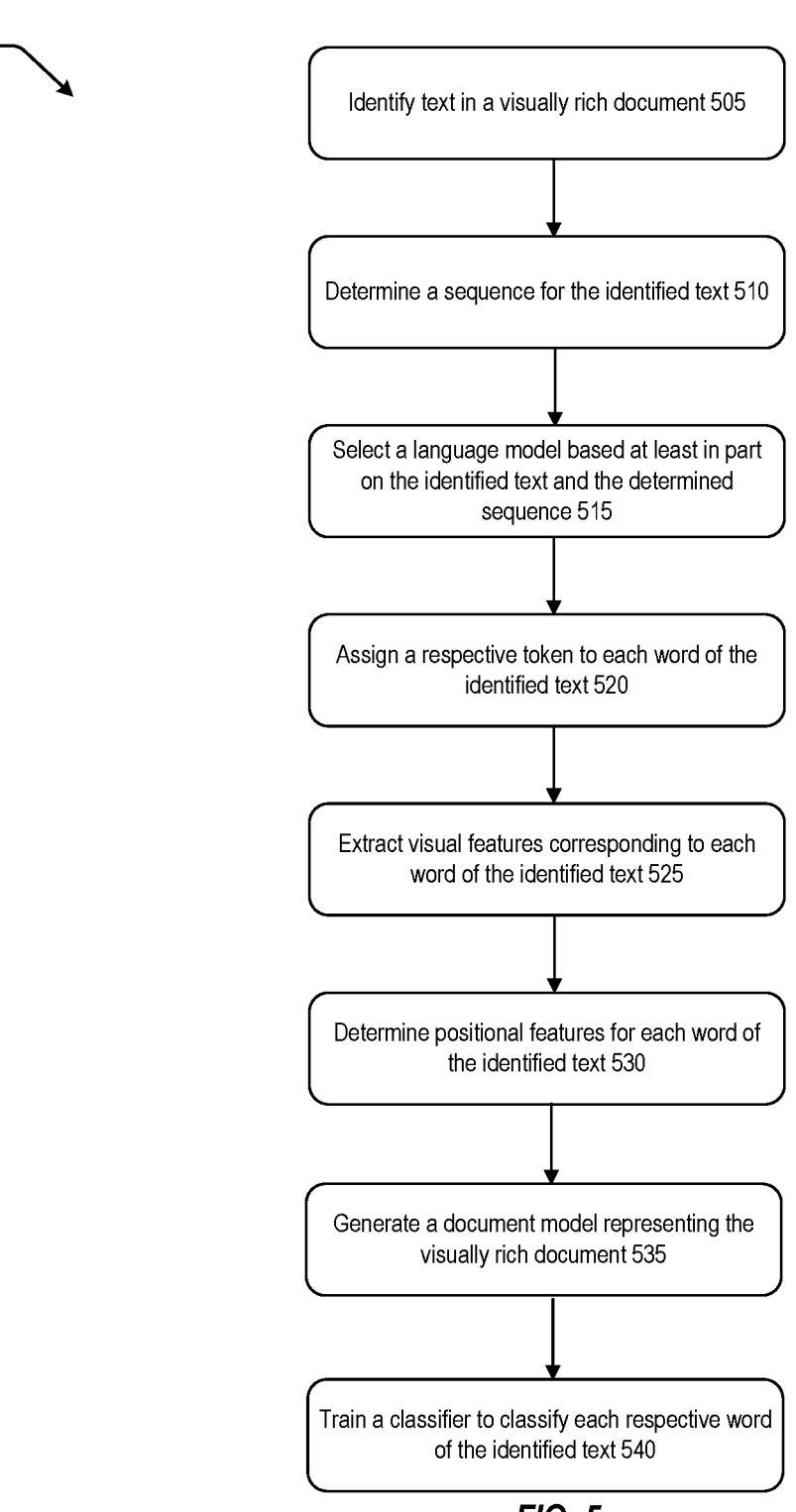

Identify text in a visually rich document 505

Determine a sequence for the identified text 510

Select a language model based at least in part on the identified text and the determined sequence 515

Assign a respective token to each word of the identified text 520

Extract visual features corresponding to each word of the identified text 525

Determine positional features for each word of the identified text 530

Generate a document model representing the visually rich document 535

Train a classifier to classify each respective word of the identified text 540

*FIG. 5*

DOMAIN ADAPTING GRAPH NETWORKS FOR VISUALLY RICH DOCUMENTS

CROSS-REFERENCES TO RELATED APPLICATIONS

The present application is a non-provisional application of and claims the benefit and priority under 35 U.S.C. 119(e) of Indian Provisional Application No. 202341013172, filed Feb. 27, 2023, the entire contents of which is incorporated herein by reference for all purposes.

BACKGROUND

Training a machine learning model to perform key-value extraction from physical documents can involve large amounts of labeled data. Supervised machine learning algorithms can require a considerable volume of labeled data with sufficient variations to learn patterns to generalize and extract key-value pairs from a new set of documents. The available training data may be from general domains and models trained on this data may struggle to classify data from different target domains. Accordingly, improvements in training a model to label key-value labeled documents are desirable.

BRIEF SUMMARY

In one general aspect, techniques of this disclosure may include identifying text in a visually rich document. The techniques may also include determining a sequence for the identified text, the sequence having a numerical order for each word of the identified text. Method may furthermore include selecting a language model based at least in part on the identified text and the determined sequence. The techniques may in addition include assigning each word of the identified text to a respective token using the selected language model and the determined sequence to generate textual features corresponding to the identified text, each respective token having a string of one or more words. The techniques may moreover include extracting visual features corresponding to the identified text, the visual features having information about a plurality of pixels representing each word of the identified text. The techniques may also include determining positional features for each word of the identified text, the positional features having respective coordinates within the visually rich document for each word of the identified text. The techniques may furthermore include generating a graph representing the visually rich document, each node in the graph representing each of the visual features, textual features, and positional features of a respective word of the identified text. The techniques may in addition include training a classifier to classify each respective word of the identified text, the classifier being trained on the graph representing the visually rich document. Other embodiments of this aspect include corresponding computer systems, devices, systems, one or more non-transitory computer readable mediums, apparatus, and computer programs recorded on one or more computer storage devices, each configured to perform the actions of the techniques.

Implementations may include one or more of the following features. Techniques may include: classifying the respective word of the identified text with the classifier. Techniques where the respective word is classified as a key or a value of a key value pair. Techniques where the graph is a graph neural network. Techniques where the language model is selected based at least in part on a domain of the identified text. Techniques where the domain may include a language or a subject matter of the identified text. Techniques where the visually rich document may include at least one of an invoice, a receipt, an insurance form, a boarding pass, or an identification card. Implementations of the described techniques may include hardware, a method or process, system, non-transitory computer readable medium, or a computer tangible medium.

BRIEF DESCRIPTION OF THE DRAWINGS

FIG. 1 is an example diagram showing a process for extracting textual features from a visually rich document (VRD) according to at least one embodiment.

FIG. 5 is an example simplified diagram showing a method for training a model to perform key-value extraction according to at least one embodiment.

DETAILED DESCRIPTION

Figure 2:
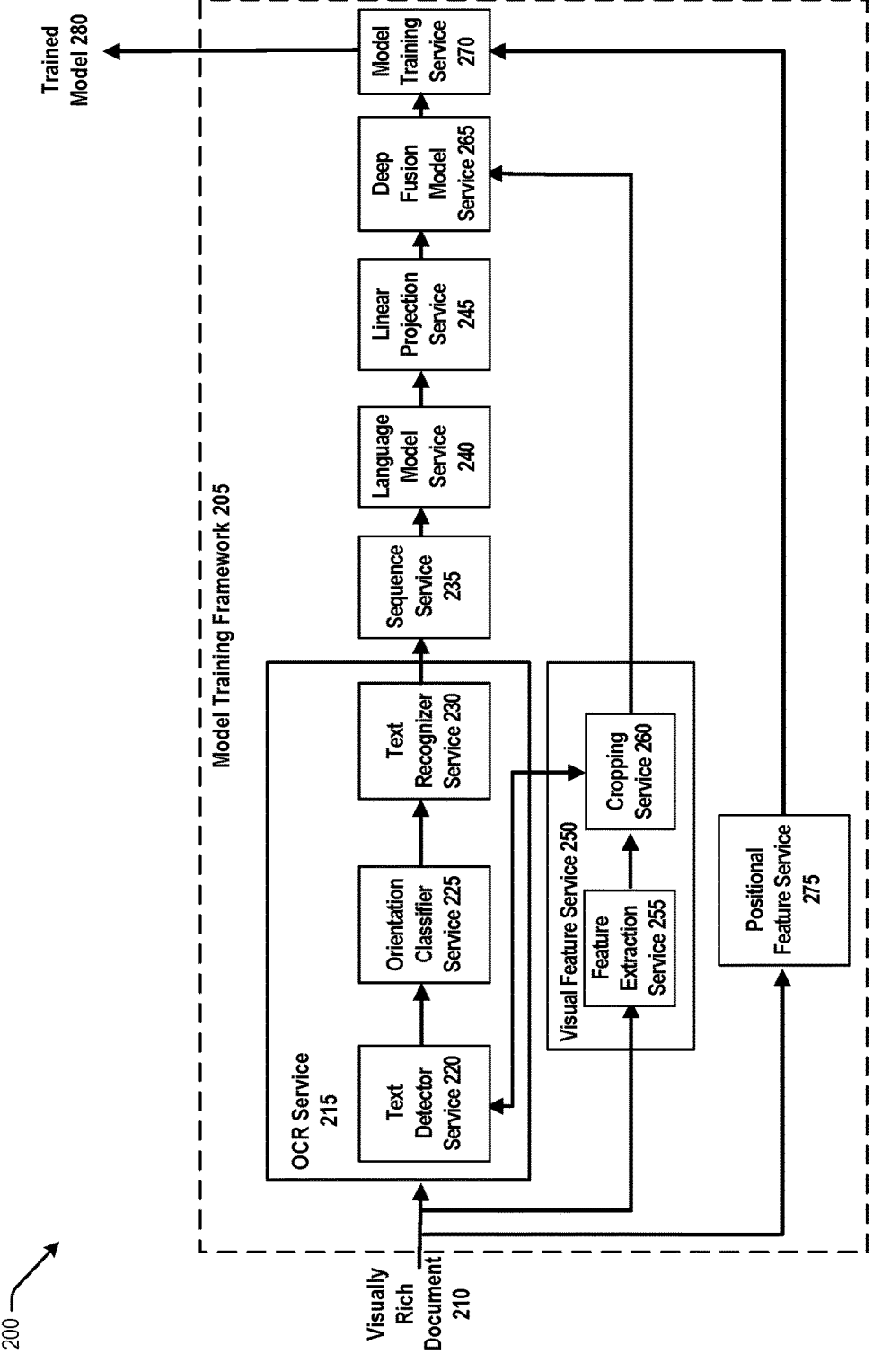
FIG. 2 shows an example simplified diagram of a model training service according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for training a model to label key-value pairs in visually rich documents (VRDs). Training a machine learning model to perform key-value extraction can require a large amount of training data. The disclosed techniques can be used to train a model to perform key-value extraction with as few as five labeled documents. VRDs can be documents that convey information beyond the document's text and a VRD can convey data though positional information, textual information, and visual information. For instance, a VRD may convey that a field "Jones" is a last name because of the proximity of "Jones" to a "Name" field. VRDs can include driving licenses, passports, identification cards, checks, receipts, invoices, medical forms, insurance forms, tax forms, account statements, insurance forms, etc.

Information in a VRD can be arranged as key-value pairs (e.g., name-value pairs, attribute-value pairs, field-value pairs, semantic classes, etc.). The pairs can comprise a key, that defines a dataset, and one or more pairs, that belongs to the data set. For example, a key can be "country" that defines a dataset as including a list of countries. Values associated with the key can include one or more countries such as "Mexico," "Ukraine," etc. A value may have to be linked to a pair to convey information because an isolated value may not have enough context to provide meaningful information. For instance, it can be difficult to know what the value "Ukraine" means without a corresponding key. "Ukraine" could refer to a country, but "Ukraine" could also refer to a business, a person, etc. For instance, a business could be named "Ukraine Imports."

Positional information can be conveyed by a document's specific layout including the position and relative arrangement of words, images, graphs, or other elements in a document. Positional information can include the relative positioning or the relative sizing of elements or fields in a document. The positional information can be learned by a neural network to generate positional embeddings. Positional information can be determined using a pre-trained model such as Processing Key Information Extraction from Documents using Improved Graph Learning-Convolutional Networks (PICK) (e.g., Yu, Wenwen, et al. "PICK: processing key information extraction from documents using improved graph learning-convolutional networks." 2020 25th International Conference on Pattern Recognition (ICPR). IEEE, 2021.), Spatial Dual-Modality Graph Reasoning for Key Information Extraction (SDMG-R) (e.g., Sun, Hongbin, et al. "Spatial Dual-Modality Graph Reasoning for Key Information Extraction." arXiv preprint arXiv:2103.14470 (2021)), etc.

Textual information can include characters extracted from VRDs through optical character recognition. The characters can be tokenized and converted to text features using text embeddings created by language models including deep learning-based language models. Text embeddings can be vectors that encodes the meaning of the word so that the distance in vector space between two words represents the similarity of those two words. Similar words can be closer in vector space than words that are dissimilar. These text embeddings can be one-hot encoded vectors or sparse matrices that can be used for syntactic matching or text matching. Such models are difficult to train and may require large amount of training data. Instead of training a language model, a pretrained language model can be selected and used to identify textual information in the visually rich document. Using a pretrained language model can allow for the identification of textual features from documents in different languages.

The language model may be selected based on the language identified in the visually rich document, and the language model can be a general domain model for the language or a domain specific language model. A domain can be a set of data, and a domain for a language model can be a particular set of written text. This text can be general written text in a particular language (e.g., a general domain), written text on a particular topic, text written for a particular audience, text written for a particular industry, or any other set of written text.

Visual information can include the styling of the font design, color, background, or images in a VRD. Styling can convey information in a VRD, and, for instance, important words may be bold, or a distinctive color compared to the background. Keys may have uniform styling across documents while values may have variable styling between documents. For instance, in a medical record, the keys may be printed in a uniform font while values may be handwritten. Visual information can be determined with a trained model including convolution deep learning models such as U-Net (Ronneberger, Olaf & Fischer, Philipp & Brox, Thomas. (2015). U-Net: Convolutional Networks for Biomedical Image Segmentation. LNCS. 9351. 234-241. 10.1007/978-3-319-24574-4_28.).

A machine learning model can be trained to classify text from a visually rich document as key value pairs. The model can receive the textual information, visual information, and positional information for a visually rich document as input to the model. The model can be a graph neural network that is initialized with the visual features and textual features for a word. These visual and textual features can be fused and used to initialize the nodes in the graph neural network. After the model has been trained, a classification layer of the graph neural network can be used to classify text from a visually rich document as a key corresponding to a particular value or a value corresponding to a particular key.

In an illustrative example, an insurance company may want to train a model to perform key-value extraction on medical records. The insurance company supplies a set of labeled VRDs with the same layout to a model training service. The labeled documents are English language documents with text from a medical domain. After selecting the appropriate pre-trained language model, the model training service can use the supplied VRDs to extract the visual features, textual features, and positional features from the visually rich documents. Visually rich documents can be time consuming and expensive to label. The disclosed model training service can train a model to perform key-value extraction using as few as one labeled document and four unlabeled documents.

Once the visual, textual, and positional feature have been extracted from the visually rich documents, the nodes of the model being trained can be initialized with the visual features and the textual features. During training, the node features can be propagated and aggregated in graph neural network being trained by the model training service until the model has learned the edge features. The edge features can be learned by message passing using the positional embeddings. After the edge features have been learned, and the model has been trained, the model can be used to extract key value pairs from the insurance companies' medical records.

FIG. 1 is a diagram 100 showing a process for extracting textual features from a visually rich document (VRD) according to at least one embodiment. In this case, the visually rich documents are medical records but other visually rich documents are possible including identification (ID) cards, drivers licenses, passports, receipts, advertisements, checks, etc.

Textual information can be extracted from a visually rich document. To extract textual information, an optical character recognition model is used to identify text in the document, and a language model is used to create vectors, called text embeddings, that record information about the identified text. The text embeddings allow a computer to give meaning to the identified text and, by comparing the similarity of the text embeddings, the computer can understand the relationship between words. For instance, a text embedding can be a multidimensional vector and similar words can be located near each other in the vector space while dissimilar words are further apart in the vector space.

Turning to process 101 in greater detail, at block 125, text can be identified in the visually rich document shown in diagram 100. The text can be identified by a machine learning model that uses optical character recognition (OCR) to identify shapes consistent with letters in the visually rich document. Optical character recognition can involve identifying areas of the document with text, determining an orientation for the text, and determining the characters in the text. Identifying areas of the document with text can include assigning a bounding box surrounding the identified text. For instance, bounding boxes are shown as round edged graphics surrounding identified text 102-124 in diagram 100. In some embodiments, identifying the text in the visually rich document can be performed by a human individual who manually identifies regions of the document with text and translates the text into a computer readable format.

At block 130, a sequence can be assigned to the identified text. During training, a particular visually rich document may be shown to the model being trained multiple times. Models can become overfit to their training data when the model learns too many features of the training data. Such overfit models can accurately classify the training data, but overfit models are not generalizable and may struggle to successfully classify new data that differs from the training data. Overfitting can be mitigated by test time augmentation where the visually rich document is randomly altered each time the document is presented to a model being trained. For example, areas of the document can be selectively blurred, the document's orientation can be changed, or the document's colors can be altered. Augmentation techniques can include rotation (+−z degree), perspective transform, affine transform, and scaling and padding. The test time augmentation allows a model to learn the training data without becoming overfit and struggling to classify new data.

Changes to the order in which text is read can make it difficult to learn how to extract textual features from a visually rich document. Identifying key-value pairs, such as key "1a Country" in identified text 110, and value "Poland" in identified text 112, can be made more difficult if the key and value are read in a different order for each document. Recognizing key-value pairs can be based at least in part on the relative positions of the identified text, and various augmentation techniques, or inconsistent text extraction, can randomly alter the order and position of the text in a visually rich document. This potential issue can be mitigated by assigning a consistent order in which text from a visually rich document is read. This order, or sequence, can be assigned to the visually rich document by a model or the order can be assigned manually to the text in the visually rich document. This order can be assigned to the original document and maintained after test time augmentation techniques have been performed on the visually rich document. For instance, an order can be assigned to the document, the document can be rotated, and the rotated document can be presented to the model with the sequence. Continuing the example, the model can read the text in the original visually rich document and the rotated document in the order specified in the sequence even though the positions of the text are different in the two images.

The sequence can mirror the order in which a human reader would read the text in the document. Key-value pairs may be arranged within a visually rich document in a way that is intuitive for a human reader, but a model may struggle to identify the pairs because the model did not pick up on this arrangement. The sequence assigned to the text in the visually rich document can present information to the model in a format that can help the model ingest the identified text in the same order that a human reader would. For example, English text is read from left to right, and a language model may ingest text in this order because text-based documents, where the document's visual features or positional features do not convey information, are read left to right.

However, a human would not necessarily read the identified text in the document shown in 100 in a left to right order. For example, reading from left to right would result in reading identify text in the following order: identified text 106 "1. Patient Initials (first, last)," identified text 110 "1a. Country," identified text 108 "Vincent," and identified text 112 "Poland." A human might read the text in the following order: identified text 106 "1. Patient Initials (first, last)," identified text 108 "Vincent," identified text 110 "1a. Country," and identified text 112 "Poland." Because a human would read the keys and values sequentially, the human readable order can make it easier to identify the two key value pairs: Key-1 "1. Patient Initials (first, last" Value-1 "Vincent"; Key-2 "1a. Country" and Value-2 "Poland." Accordingly, a model's identification of key-value pairs can be improved by assigning a sequence to the text in the document.

At block 135, the identified text can be processed in the assigned sequence to determine the text features. Processing the text can include providing the text to a language model in the order specified in the sequence. The language model can perform various natural language process techniques on the input text. For example, the model can generate a feature vector for the input text. The natural language techniques can include part-of-speech tagging, parsing, grammar induction, information retrieval, etc.

Language models can perform natural language processing tasks on text that is input into the model, however, the model may struggle to perform these tasks on text that differs from the model's training data. For example, a model that is trained on Spanish text may struggle to process English text. Models can be trained on general text from a language, but some models may be trained on a particular set of text from a language. In order to perform some tasks, a model may need to be trained on a particular corpus of text in a particular language. For example, a model trained on a particular language may struggle to process text that is intended for a particular audience. For instance, text can be intended for members of a particular industry (e.g., medical text) or text can be prepared for a particular audience (e.g., fans of a particular musician). Group specific terminology, slang, jargon, etc. can make it difficult for a model that was trained on general datasets to process text that was intended for a particular audience. For example, a general English language model may not accurately classify medical terminology (e.g., subdural hematoma), or slang from a particular fanbase (e.g., Swifties).

Training a language model can require large amounts of training data. Rather than training a model to perform natural language processing, in addition to training the model for key-value extraction, a pre-trained language model can be selected and used to process the text. The pre-trained language model can have its weights frozen so that the model does not learn from the text from the visually rich documents that is input into the model. When the model has its weights frozen, the weights can be frozen for all layers, or the weights can be frozen for a subset of the layers while some unfrozen layers may be trained for the new dataset The pre-trained model can be manually selected by a human or the model can be selected by a model.

FIG. 2 shows a simplified diagram 200 of a model training framework 205 according to at least one embodiment. The model can be trained to perform key-value extraction. Key-value extraction can be the process of identifying, and linking, a constant that defines a dataset, called a key, with a variable belonging to the dataset (e.g., a value, etc.). A model can use textual features, visual features, and positional features to identify key-value pairs in a visually rich document. Each service within the model training framework 205, and any other service of this disclosure, comprises software, hardware, or any combination of software and hardware components.

Key-value extraction from VRDs can include extracting text from the documents. The text can be extracted so that textual features can be generated for the visually rich document. Text extraction can be the process of converting typed or handwritten text into a machine-readable format, and text detection can be performed through optical character recognition (OCR). The model training framework 205 can receive a visually rich document 210. The received document can be provided to an OCR service 215 that can comprise at least one of: a text detector service 220, an orientation classifier service 225, or a text recognizer service 230.

Text detector service 220 can detect areas in VRD 210 that contain text. OCR can be computationally demanding and using text detector service 220 can reduce the search space by segmenting VRD 210 into areas with text, where text recognition can be performed, and areas without text that may be excluded from text detection. These segments can correspond to a bounding box, and, in some embodiments, the bounding boxes can be shared with other elements in the model training framework 205.

Orientation classifier service 225 can detect the orientation of words in VRD 210. Information can be conveyed by the orientation of a word and, for example, "smug" can be "gums" depending on the word's orientation and the order in which the characters are read. The text in a word can be detected by text recognizer service 230. Text can be recognized using a variety of techniques including feature extraction, matrix matching, etc.

After the text has been recognized, the text can be provided to a sequence service 235. The sequence service 235 can determine an order for the recognized text. The text can be provided from the sequence service 235 to a language model service 240. The language model executing within the language model service 240 can tokenize the text and decode the sequence to generate a sequence of sub-token embeddings for the recognized text. Tokenizing the text can mean dividing the text into a sequence of tokens representing words, phrases, sentences, paragraphs, etc. Sub-token embeddings can be vectors that represent the features of the words within a token. A token can have one or more sub-token embeddings. For instance, a token representing a single word may have a single sub-token embedding, but a token representing a phrase may have multiple sub-token embeddings (e.g., for multiple words in the token).

The language model in language model service 240 can be selected based on the visually rich document 210. Training a language model to perform natural language processing can require a large amount of training data. The number of labeled visually rich documents needed to train a model to perform key value extraction can be reduced by using a pretrained language model that has been trained to tokenize and generate embeddings for input text. This language model can be trained on general domains for a language (e.g., Cantonese) or a specific domain within that language (e.g., Cantonese computer science text).

A visual feature service 250 within the model training framework 205 can identify the visual features from the visually rich document 210. Visually rich documents can use various visual cues to convey information. A human reading a visually rich document may understand, for instance, that bold text is a key, and that handwritten text is a value. In another example, the key may be large font text and the value may be written in smaller font text. In another example, each key value pair may share similar visual characteristics and the text in a particular font and font size may belong to a key value pair. Visual features can convey these visual cues in a machine-readable format so that a model can be trained to learn to classify text based at least in part on the visual characteristics of text.

The feature extraction service 255 in the visual feature service 250 can create a vector representing the features of each pixel in the visually rich document 210. These features can be extracted by a visual feature extractor such as a UNET model with a Residual Networks (ResNet) backbone or any other model that is capable of extracting visual features from images or documents. The feature extractor can be a convolutional neural network that was pre-trained on a domain that corresponds to the visually rich document, and the feature extractor can be swapped with any other visual feature extractor based on the type of visually rich document being analyzed. The features extracted by the feature extractor can be document specific and the weights of the feature extractor may not be frozen during the disclosed training techniques. A model with frozen weights may not continue training and learning the features of visually rich documents that are input into the model. However, a model without frozen weights may continue training.

The visually rich document 210 can be passed from the feature extraction service 255 to a cropping service 260. Cropping can be used to isolate the visual features around a particular selection of text. The cropping service 260 can use the bounding boxes identified by the text detector service 220 to identify areas of the visually rich document that correspond to text. In some embodiments, the cropping service 260 can identify text and create bounding boxes. These bounding boxes can be shared by the cropping service with the text detector service 220 or any other service in the model training framework 205. The cropping service 260 can identify feature vectors for the pixels corresponding to the area within a bounding box. These identified features can be the visual features corresponding to the text within the bounding box.

The textual features and visual features can be combined by the deep fusion model service 265. A deep fusion model deep fusion can be a series of smaller neural networks which can re-weigh the text and visual features. These smaller neural networks can be pretrained models or the models can be learn the weights during training. Textual features identified by the language model service 240 and visual features identified by the visual feature service 250 can be correlated by the deep fusion model service 265 to create a vector or matrix representing the combined visual and textual features for a particular word, phrase, sentence, or other grouping of text. A token or a sub-token embedding may be associated with the visual features of pixels representing text corresponding to the token or sub-token embedding.

The model training service 270 can initialize a machine learning model with the fused visual features and textual features output by the deep fusion model service 265. The machine learning models trained by the model training service 270 can include graph neural networks, transformer models, multilayer perceptrons (MLPs), or statistical models. The model can be a neural network and each token or sub-token can be a node in the initialized machine learning model. For example, the machine learning model can be a graph neural network such as a convolutional neural network. A graph neural network can include nodes connected by edges. The model training service 270 can initialize the edges between nodes with at least the distance between the bounding boxes corresponding to each node. For example, the distance between two bounding boxes can be the distance between the center coordinates of each bounding box. These distances may be provided to the model training service 270 by the positional feature service 275.

The model training service 270 can assign positional features, determined by the positional features service 275, to the nodes. The positional features can include representation of text's absolute location within the visually rich document 210, and these positional features can be converted into feature vectors by neural networks in the model training service 270. The positional features can be coordinates in any appropriate coordinate service such as Cartesian coordinates (e.g., x-y coordinates). The model training service 270 can concatenate the node embeddings (e.g., the feature vector corresponding to textual and visual features of the node) with the position embeddings (e.g., the feature vector corresponding to the feature vector representing the positional features corresponding to the node). The model training service 270 can concatenate the concatenated vectors for a node with the initial edge embeddings (e.g., the vector representing the features corresponding to the edge) that correspond to the node. The edge embeddings that correspond to a node can be the edge embeddings for the edges connected to the node.

The positional features service 275 can divide the visually rich document into a number of regions. For example, the visually rich document 210 can be divided into a five-by-five grid of twenty-five equally sized regions. In some embodiments, the size of each region can vary, and the number of regions may be larger or smaller than twenty-five. The positional features for a particular text region (e.g., text corresponding to a token or a sub token embedding) can be the absolute coordinates of that text region (e.g., an x-y coordinate corresponding to a bounding box surrounding the text) or region coordinates corresponding to the region that contains the text. For example, all text within a particular region can be assigned positional embeddings that correspond to the entire region or a centroid of the region.

The model training service 270 can train a model to classify text within the visually rich document as a key or a value. Classifying text as a key can mean identifying a corresponding value for that key and classifying text as a value can mean identifying a corresponding key for that value. The model can use the visual features, textual features, and positional features of text in the visually rich document 210 to classify text as belonging to key value pairs. A key may have multiple values that correspond to the key, and a value may have multiple keys that correspond to the value.

Various techniques can be used by the model training service 270 to train the model. For example, multi-head attention techniques can be used to focus the model on different regions of the visually rich document 210. The model training service can use various filters to focus the model on different regions of the visually rich document 210. Attention techniques are described in greater detail in the following paper: Ashish Vaswani, Noam Shazeer, Niki Parmar, Jakob Uszkoreit, Llion Jones, Aidan N. Gomez, Łukasz Kaiser, and Illia Polosukhin. 2017. Attention is all you need. In Proceedings of the 31st International Conference on Neural Information Processing Services (NIPS'17). Curran Associates Inc., Red Hook, NY, USA, 6000-6010. The model training framework 205 can use augmentation techniques such as test time augmentation described above. Once the model training service 270 has finished training the model, a trained model 280 can be output from the model training framework 205.

Figure 3:
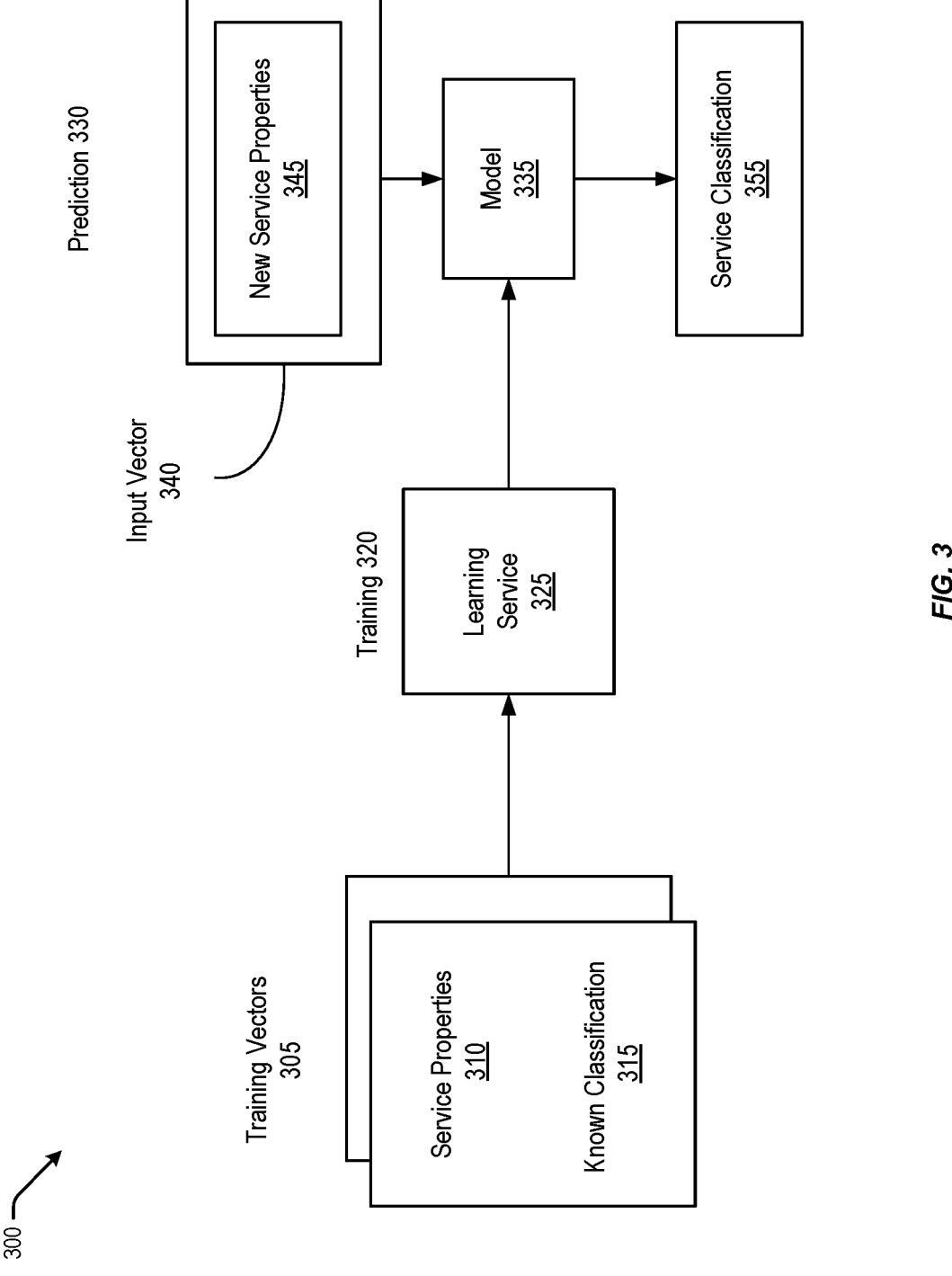
FIG. 3 depicts an example machine learning model according to at least one embodiment.

FIG. 3 depicts a machine learning model according to the embodiments of the present disclosure. Training vectors 305 are shown with service properties 310 and a known classification 315. As examples, a service can be a machine learning model that can be deployed to a cloud network. Service properties 310 can include various fields. For ease of illustration, only two training vectors are shown, but the number of training vectors may be much larger, e.g., 10, 30, 100, 1,000, 10,000, 100,000, or more. Training vectors could be made for different services, the same service over different time periods.

Service properties 310 have property fields that can correspond to properties of a machine learning model or cloud service and the skilled person will appreciate the various ways that such services or models can be configured. Known classifications 315 include hardware or software characteristics such as the number of nodes, the number of central processing unit (CPU) cores, the number of graphical processing units (GPUs), the number of CPUs, the type of CPUs, the type of CPUs, the amount of memory, and the like. The classification can have arbitrary support (e.g., a real number) or be an element of a small finite set. The classification can be ordinal, and thus the support can be provided as an integer. Accordingly, a classification can be categorical, ordinal, or real, and can relate to a single measurement or multiple measurements and may be high dimensional.

Training vectors 305 can be used by a learning service 325 to perform training 320. A service, such as learning service 325, being one or more computing devices configured to execute computer code to perform one or more operations that make up the service. Learning service 325 can optimize parameters of a model 335 such that a quality metric (e.g., accuracy of model 335) is achieved with one or more specified criteria. The accuracy may be measured by comparing known classifications 315 to predicted classifications. Parameters of model 335 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measure of how accurate the current state of the machine learning model is. The gradient can be used in conjunction with a learning step (e.g., a measure of how much the parameters of the model should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or that the cost function does not change significantly for several time steps, as examples. In other embodiments, training can be implemented with methods that do not require a hessian or gradient calculation, such as dynamic programming or evolutionary algorithms.

A prediction stage 330 can provide a predicted entity classification 355 for a new entity's entity signature vector 340 based on new service properties 345. The new service properties can be of a similar type as service properties 310. If new service properties are of a different type, a transformation can be performed on the data to obtain data in a similar format as service properties 310. Ideally, predicted service classification 355 corresponds to the true service classification for input vector 340.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figures 4A, 4B:
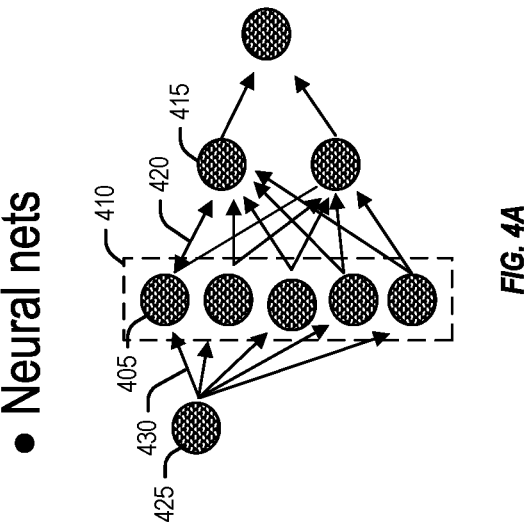
FIG. 4A shows an example machine learning model of a neural network to at least one embodiment.
FIG. 4B shows an example machine learning model of a support vector machine (SVM) to at least one embodiment.

FIG. 4A shows an example machine learning model of a neural network. As an example, model 435 can be a neural network that comprises a number of neurons (e.g., Adaptive basis functions) organized in layers. For example, neuron 405 can be part of layer 410. The neurons can be connected by edges between neurons. For example, neuron 405 can be connected to neuron 415 by edge 420. A neuron can be connected to any number of different neurons in any number of layers. For instance, neuron 405 can be connected to neuron 425 by edge 430 in addition to being connected to neuron 415.

The training of the neural network can iteratively search for the best configuration of the parameter of the neural network for feature recognition and classification performance. Various numbers of layers and nodes may be used. A person with skills in the art can easily recognize variations in a neural network design and design of other machine learning models. For example, neural networks can include graph neural networks that are configured to operate on unstructured data. A graph neural network can receive a graph (e.g., nodes connected by edges) as an input to the model and the graph neural network can learn the features of this input through pairwise message passing. In pairwise message passing, nodes exchange information and each node iteratively updates its representation based on the passed information. More detail about graph neural networks can be found in the following reference: Wu, Zonghan, et al. "A comprehensive survey on graph neural networks." IEEE transactions on neural networks and learning systems 32.1 (2020): 4-24.

FIG. 4B shows an example machine learning model of a support vector machine (SVM). As another example, model 435 can be a support vector machine. Features can be treated as coordinates in a coordinate space. Samples of training data points (e.g., multidimensional data points composed of the measured data). The training data points are distributed in the space, and the support vector machine can identify boundaries between the classifications. For example, point 435 and point 440 can be separated by boundary 445.

FIG. 5 is a simplified diagram showing a method 500 for training a model to perform key-value extraction according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 500 in greater detail, at block 505, text in a visually rich document can be identified. The text can be identified by a computer service. A visually rich document can be a physical or digital document that conveys information using visual cues in addition to the document's text. For instance, the position, font, size, and color of text in the document can inform the text's meaning. As an example, key value pairs in the document may be identified because the key is bold text while the corresponding values are plain text. The text can be identified using a model trained to perform optical character recognition in the document. A visually rich document can be an invoice, a receipt, an insurance form, a boarding pass, an identification card, or any other document that conveys information using both text and visual characteristics.

At block 510, a sequence for the identified text can be determined. The sequence can be determined by a computer service, and the sequence can be a numerical order for each word of the identified text. The sequence can be the order in which a model processes the text from the visually rich document. The model can process the text as input to the model and the sequence can be the order in which the text is input into the model. Determining the sequence can be achieved by clustering and sorting the text identified at block 505 as described above with reference to FIG. 1.

At block 515, a language model can be selected based at least in part on the identified text and the determined sequence. The language model can be a pretrained model that was trained on a particular language. The language model can be selected in response to a user input. In some embodiments, the model can be trained on a particular domain. A domain can text in a particular language that a general natural language processing model for that language may struggle to classify and understand. For example, a general English language model may struggle to classify medical records because the records contain text from a medical domain. This medical domain can include medical terminology that the general model has not encountered during training and medical domain specific word choices that have a different meaning from their general usage. For example, "the patient is coding" may mean that the patient is in cardiac arrest while a general language model may incorrectly interpret the phrase to mean that the patient is writing software.

At block 520, each word of the identified text can be assigned to a respective token by the selected language model. The identified text can be assigned by the model in an order based on the sequence determined at 510. A token can be a group of one or more words, and, a token can be a single word, a phrase, a sentence, a group of sentences, and the like. For example, the sentence "the dog barked, and I told him to be quiet" can be broken into the tokens "the dog barked," "and I told him to be quiet" or the sentences can be tokenized into individual words. The words in a token may be contiguous words with a token representing a block of text (e.g., a token can comprise neighboring words).

The tokens can be used to assign textual features to the words in the token. For example, the textual features can include a token order derived from the sequence determined at 510. The textual features can be represented as a numeric vector representing characteristics of the word corresponding to the vector. Two words that have similar meanings may be located near each other in vector space, and two words that have different meanings may not be near each other in vector space.

At block 525, visual features corresponding to the identified text can be extracted. The visual features for a word can comprise information about the pixels representing that word in the visually rich document. The word can be surrounded by a bounding box and the plurality of pixels representing the word can be the pixels within the bounding box. Visual information can include the color of each pixel and one or more aggregated statistics calculated from the color of each pixel in the bounding box (e.g., the total number of pixels, the average color of a pixel in the bounding box, etc.). The visual information may include information from regions of interest such as the edge corner interactions.

At block 530, the positional features for each word of the identified text can be determined. The positional features for a word can be coordinates within the visually rich document that correspond to the word. For example, the coordinates can be a coordinate for the center of the bounding box surrounding the word. The coordinates can be any information that indicates the position of the word in the visually rich document.

At block 535, a document model representing the visually rich document can be generated. The document model can be any type of machine learning model, and, for example, the document model can be a graph neural network with nodes connected by edges. A particular node can represent the visual features, the textual features, and the positional features of a particular word of the identified text. In some embodiments, a particular node can represent the visual features, the textual features, and the positional features of a particular token. Each word, or token, identified in the visually rich document can have a corresponding node.

At block, 540, a classifier can be trained to classify each respective word of the identified text. The classifier can be trained on the graph representing the visually rich document. The techniques may include classifying a word of the identified text using the trained classifier. The word can be classified as a key or a value, and classifying the word can include identifying the word as a key or a value for a particular class of key value pairs. For example, a word can be classified as the key or a value for the key-value pair "last name." In some embodiments, a word may be classified with an unknown category. The unknown category can mean that the model does not have enough information to classify the word as a key or a value. In some embodiments, multiple words can be classified as forming a single key, and multiple words can be classified as belong to a particular pair.

Figure 6:
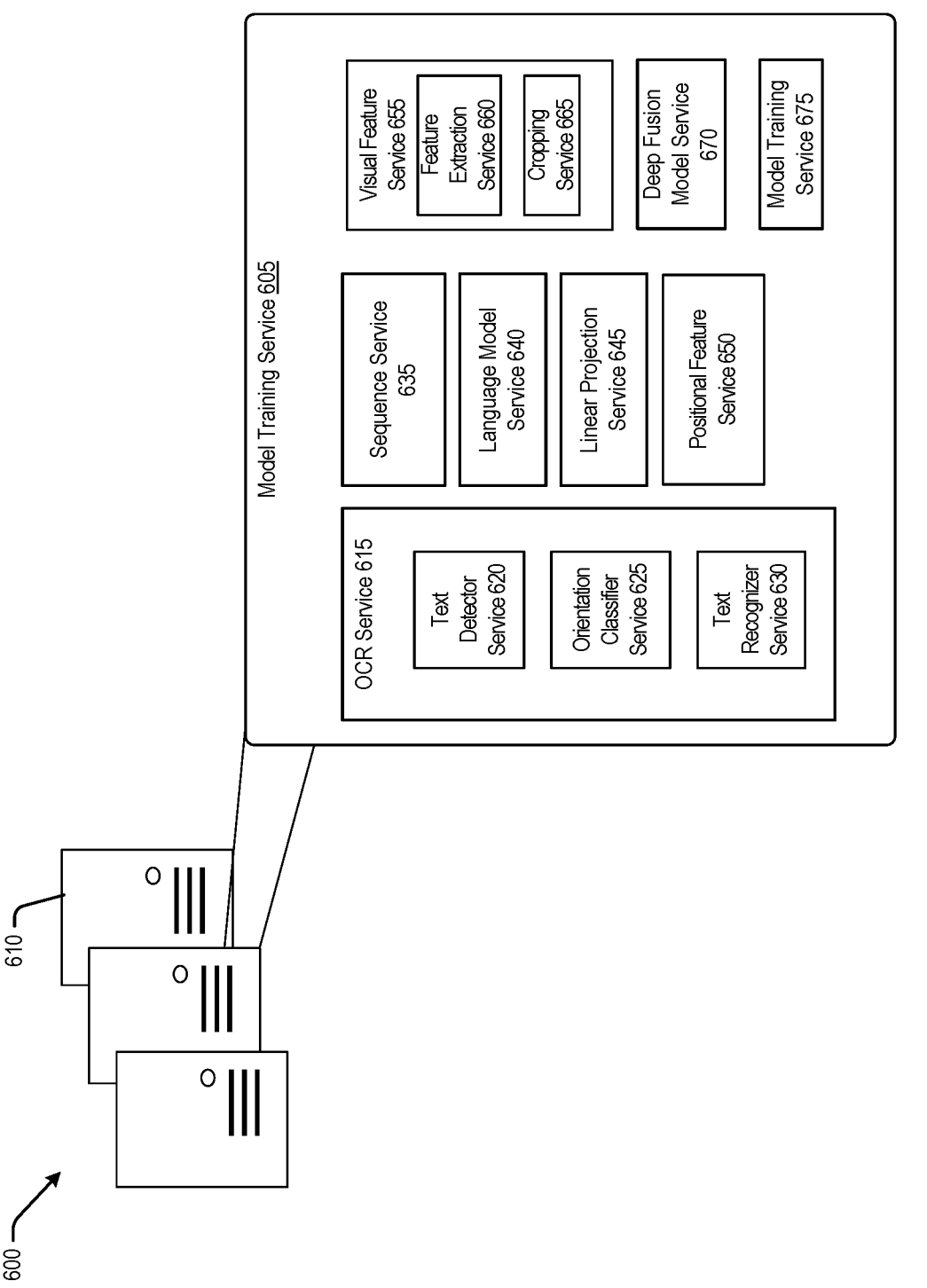
FIG. 6 is an example simplified diagram showing a system architecture for model training service according to an embodiment.

FIG. 6 is a simplified diagram 600 showing a service architecture for model training service according to an embodiment. Each service depicted in diagram 600, and any other service of this disclosure, comprises software, hardware, or any combination of software and hardware components. The pseudo-labeling service 605 can be hosted on computing devices 610. An optical character recognition (OCR) service 615 in pseudo-labeling service 605 can identify characters in a visually rich document (VRD). OCR can be computationally demanding and text detector service 620 can reduce the amount of OCR processing by segmenting the VRD into areas with characters, where text recognition should be performed, and areas without characters that should be excluded from text recognition. Orientation classifier service 625 can reduce the amount of OCR that is performed by identifying text's orientation so that text recognition is performed with the correct orientation. Text recognizer service 630 can recognize and extract text from the VRD.

Sequence service 635 can assign a sequence to the words identified in a visually rich document. This sequence can be a sequential order that is assigned to some or all of the words in a visually rich document. Language model service 640 can select an appropriate pre-trained language model for the text extracted by the OCR service 615. The model can be selected in response to a user identifying the appropriate language (e.g., via a graphical user interface) or a selection model in the language model service 640 can identify and select the appropriate language model. Once a model is selected, the language model service 640 can tokenize the text in a visually rich document and create word embeddings for the text.

During training of the final key value extraction model, the weights for the pre-trained language model can be frozen so that the pre-trained model does not continue its own training. Freezing the weights can involve freezing some of the weights and allowing other weights within the model to be trained. The word embeddings created by a language model in the language model service 640 can be projected over linear layers by the linear projection service as described above. The positional features for a visually rich document can be extracted by the positional feature service 650. Visual features can be extracted by the visual feature service 655. A feature extraction service 660 in the visual feature service 655 can assign a feature vector for some or all of the pixels in the visually rich document. The cropping service 655 in the visual feature service 655 can crop the visually rich document to identify the pixels corresponding to a particular word, and the feature vectors for those pixels can be associated with the particular word. For example, the pixels corresponding to a particular word can be the pixels within the bounding box corresponding to that particular word.

The deep fusion model service 670 can fuse the visual embeddings and the word embeddings (e.g., visual features and the word features) to initialize the node features for the graph neural network that is trained by the model training service 675. These features can be fused using Kronecker fusion in some embodiments. The model training service 675 can train a graph neural network to identify and classify key-value pairs. The model training service can use the positional features, from the positional feature service 650, to train the graph neural network. The model training service 675 can propagate and aggregate node features in the GNN during the message passing, which uses positional embedding and multi-head attention to learn the edge features. The graph neural network can include a classification layer that can be used to classify words from the visually rich document as key-value pairs. The models trained by the model training service can include any family of machine learning models, including deep learning models and statistical models.

Figure 7:
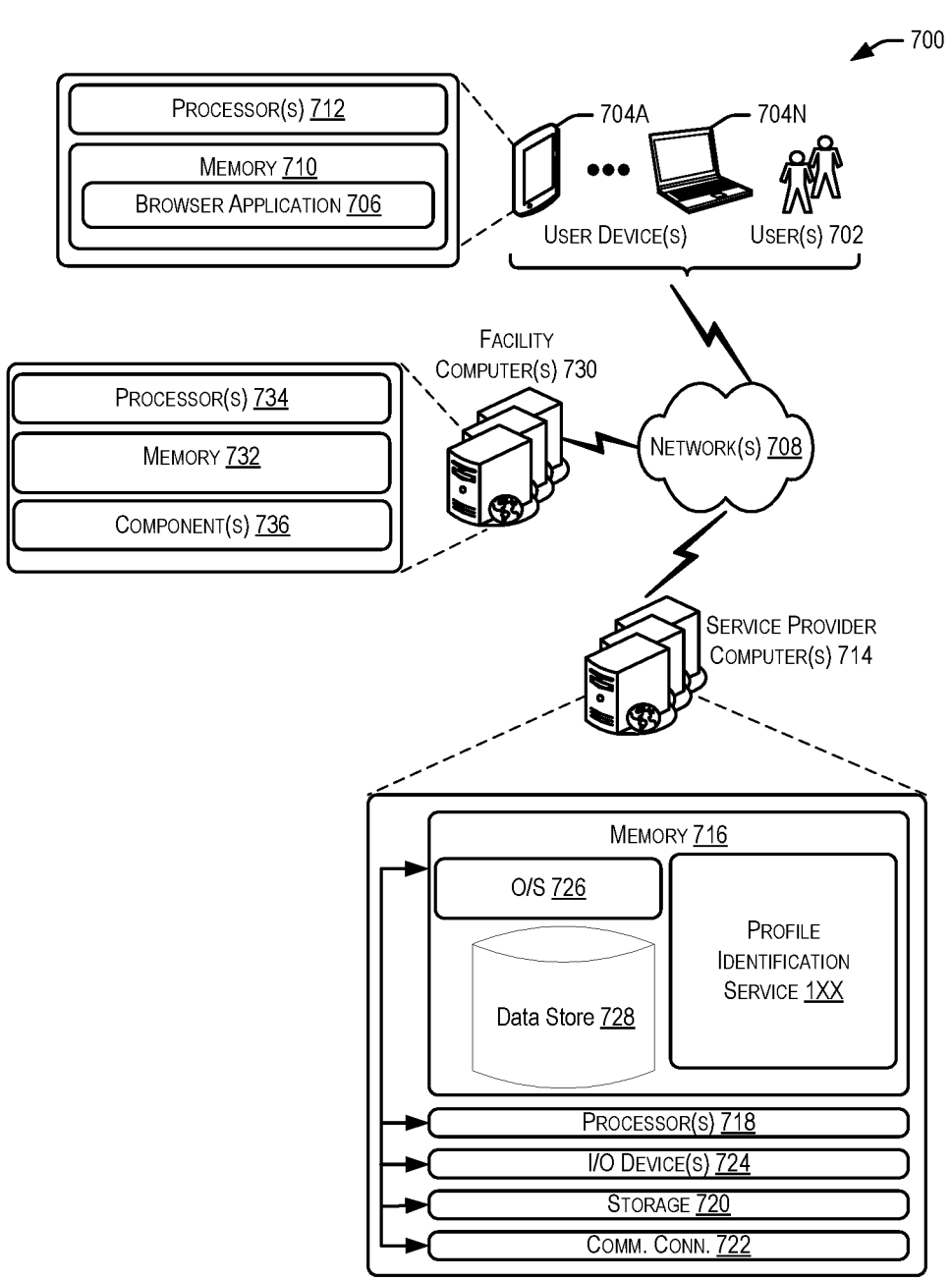
FIG. 7 illustrates an example architecture for a prompt refinement service that includes one or more service provider computers, a user device, and one or more facility computers in accordance with at least one embodiment.

FIG. 7 illustrates an example of an architecture 700 for a model training service, such as the model training framework 205, that includes one or more service provider computers, a user device, and one or more facility computers in accordance with at least one embodiment. In the architecture 700, one or more users 702, such as customers requesting key-value extraction from visually rich documents, may utilize user computing devices 704A-N (collectively, user devices 704) to access a browser application 706 or a user interface (UI) that can be accessed through the browser application 706 and via one or more networks 708, to receive visually rich documents, which may be presented and interacted with via browser application 706 or the UI accessible through the browser application 706. The "browser application" 706 can be or include any browser control or native application that can access and/or display a network page or other information. A native application may include an application or program that has been developed for use on a particular platform, such as an operating service, or a particular device such as a particular type of mobile device.

In accordance with at least one embodiment, the user devices 704 may be configured for communicating with service provider computers 714 and facility computers 730 via networks 708. The user devices 704 may include at least one memory, such as memory 710, and one or more processing units or one or more processors 712. The memory 710 may store program instructions that are loadable and executable on the one or more processors 712, as well as data generated during the execution of these programs. Depending on the configuration and type of the user devices 704, the memory 710 may be volatile, such as random access memory (RAM), and/or non-volatile such as read-only memory (ROM), flash memory, etc. The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the user devices 704. In some implementations, the memory 710 may include multiple different types of memory, such as static random access memory (SRAM), dynamic random access memory (DRAM), ROM, etc.

Turning to the contents of the memory 710 in more detail, the memory 710 may include an operating service and one or more application programs or services for implementing the features disclosed herein. Additionally or alternatively, the memory 710 may include one or more services for implementing the features described herein such as the model training framework 205.

The architecture 700 may additionally include one or more service provider computers 714 that may, in some examples, provide computing resources such as, but not limited to, client entities, low latency data storage, durable data storage, data access, management, virtualization, hosted computing environment or "cloud-based" solutions, prompt refinement or engineering feature implementation, etc. The service provider computers 714 may implement or be an example of one or more machine-learning models or one or more service provider computers (e.g., the computing devices) described herein with reference to FIGS. 1-6 and/or throughout the disclosure. The one or more service provider computers 714 may also be operable to provide site hosting, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represent the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements, such as set-top boxes, etc., as well as in non-client/server arrangements such as locally stored applications, peer-to-peer arrangements, etc. In embodiments, the users 702 may communicate with the facility computers 730 via networks 708, and the facility computers 730 may communicate with the service provider computers 714 via networks 708. In some embodiments, the service provider computers 714 may communicate, via networks 708, with one or more third party computers (not illustrated) to obtain data inputs for the various algorithms of the generation features described herein. In accordance with at least one embodiment, the service provider computers 714 may receive text data, video data, image data, one or more prompts, aggregated inputs generated from the foregoing, or the like for at least refining a prompt for a generative model.

The one or more service provider computers 714 may be or include any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 714 may be in communication with the user device 704 via the networks 708, or via other network connections. The one or more service provider computers 714 may include one or more servers, which may be arranged in a cluster or as individual servers not associated with one another. In embodiments, the service provider computers 714 may be in communication with one or more third party computers (not illustrated) via networks 708 to receive or to otherwise obtain data including text data, video data, image data, one or more prompts, aggregated inputs generated from the foregoing, or the like for at least refining a prompt for a generative model.

In one illustrative configuration, the one or more service provider computers 714 may include at least one memory, such as memory 716, and one or more processing units or one or more processors 718. The one or more processors 718 may be implemented as appropriate in hardware, computer-executable instructions, firmware, or any combination thereof. Computer-executable instruction or firmware implementations of the one or more processors 718 may include computer-executable or machine-executable instructions written in any suitable programming language to perform the various functions described when executed by a hardware computing device such as a processor. The memory 716 may store program instructions that are loadable and executable on the one or more processors 718, as well as data generated during the execution of these programs. Depending on the configuration and type of the one or more service provider computers 714, the memory 716 may be volatile, such as RAM, and/or non-volatile such as ROM, flash memory, etc. The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program services, and other data for the computing devices. In some implementations, the memory 716 may include multiple different types of memory, such as SRAM, DRAM, ROM, etc.

The memory 716, the additional storage 720, removable and/or non-removable, are examples of non-transitory computer-readable storage media. For example, computer-readable storage media may include volatile or non-volatile, removable or non-removable media implemented in any method or technology for storage of information such as computer-readable instructions, data structures, program services, or other data. The memory 716 and the additional storage 720 are examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also include one or more communication connection interfaces 722 that can allow the one or more service provider computers 714 to communicate with a data store, another computing device or server, user terminals, and/or other devices on the networks 708. The one or more service provider computers 714 may also include one or more I/O devices 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the model training framework 205. The architecture 700 includes facility computers 730. In embodiments, the service provider computers 714 and the model training framework 205 may be configured to generate and transmit instructions, via networks 708, to components 736 in communication or otherwise associated with facility computers 730. For example, the instructions may be configured to activate or otherwise trigger the components 736 for transmitting a trained model or visually rich documents in accordance with the operations of the model training framework 205. The facility computers 730 may include at least one memory, such as memory 732, and one or more processing units or one or more processors 734. The memory 732 may store program instructions, which may include one or more machine-learning models as disclosed herein, that can be loaded and executed on the one or more processors 734, as well as data generated during the execution of these programs. Depending on the configuration and type of the facility computers 730, the memory 732 may be volatile, such as random access memory (RAM), and/or non-volatile such as read-only memory (ROM), flash memory, etc. The facility computers 730 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the facility computers 730. In some implementations, the memory 732 may include multiple different types of memory, such as static random access memory (SRAM), dynamic random access memory (DRAM), ROM, etc.

Turning to the contents of the memory 732 in more detail, the memory 732 may include an operating system and one or more application programs or services for implementing the features disclosed herein. Additionally, the memory 732 may include one or more services for implementing the features described herein, which may include model training framework 205. In some embodiments, the service provider computers 714 and the model training framework 205 may train a model to perform key-value extraction based at least in part on visually rich documents provided to the model training framework 205. The user device 704 and the browser application 706 may be configured to transmit the output to the user 702. In accordance with at least one embodiment, the model training framework 205 may be configured to receive visually rich documents, pretrained language models, and the like. In some embodiments, some, a portion, or all of these input data may be stored and transmitted as text files or other files, which may include text data. In some embodiments, the model training framework 205 may be configured to implement one or more machine-learning models, computer models, computer algorithms, etc., to select a particular pretrained language model based on the input visually rich documents, and the like.

The model training framework 205 may be configured to generate and transmit a user interface or data objects for updating a user interface presented via browser application 706 and user device 704 for presenting labeled visually rich documents, key-value pairs identified visually rich documents, aggregated statistics based on the identified key-value pairs, or any components thereof or associated therewith to the user 702. Other graphical updates, feedback mechanisms, and data object generation associated with the prompt refinement features described herein may be implemented by the service provider computers 714 and/or the model training framework 205.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
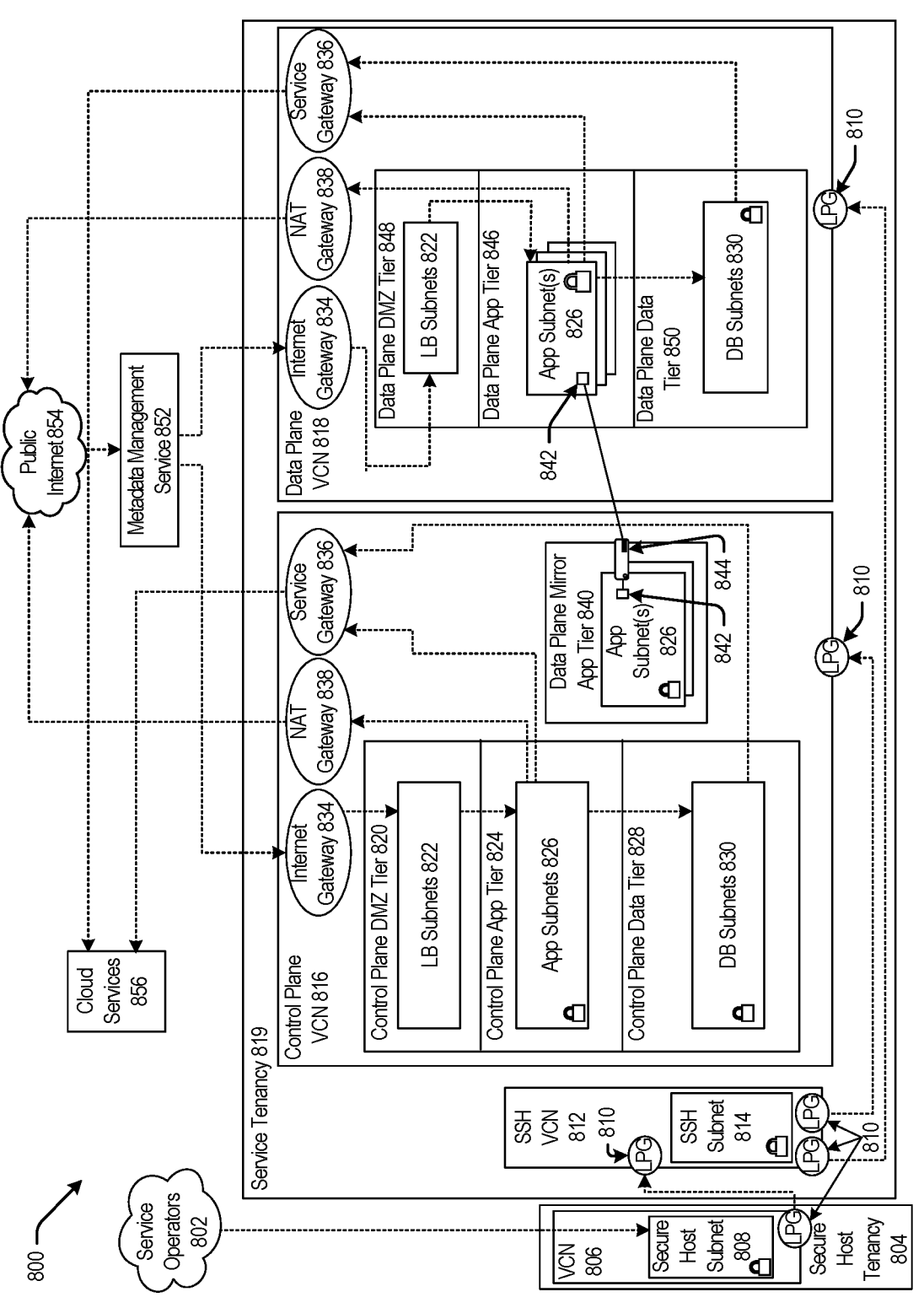
FIG. 8 is an example block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
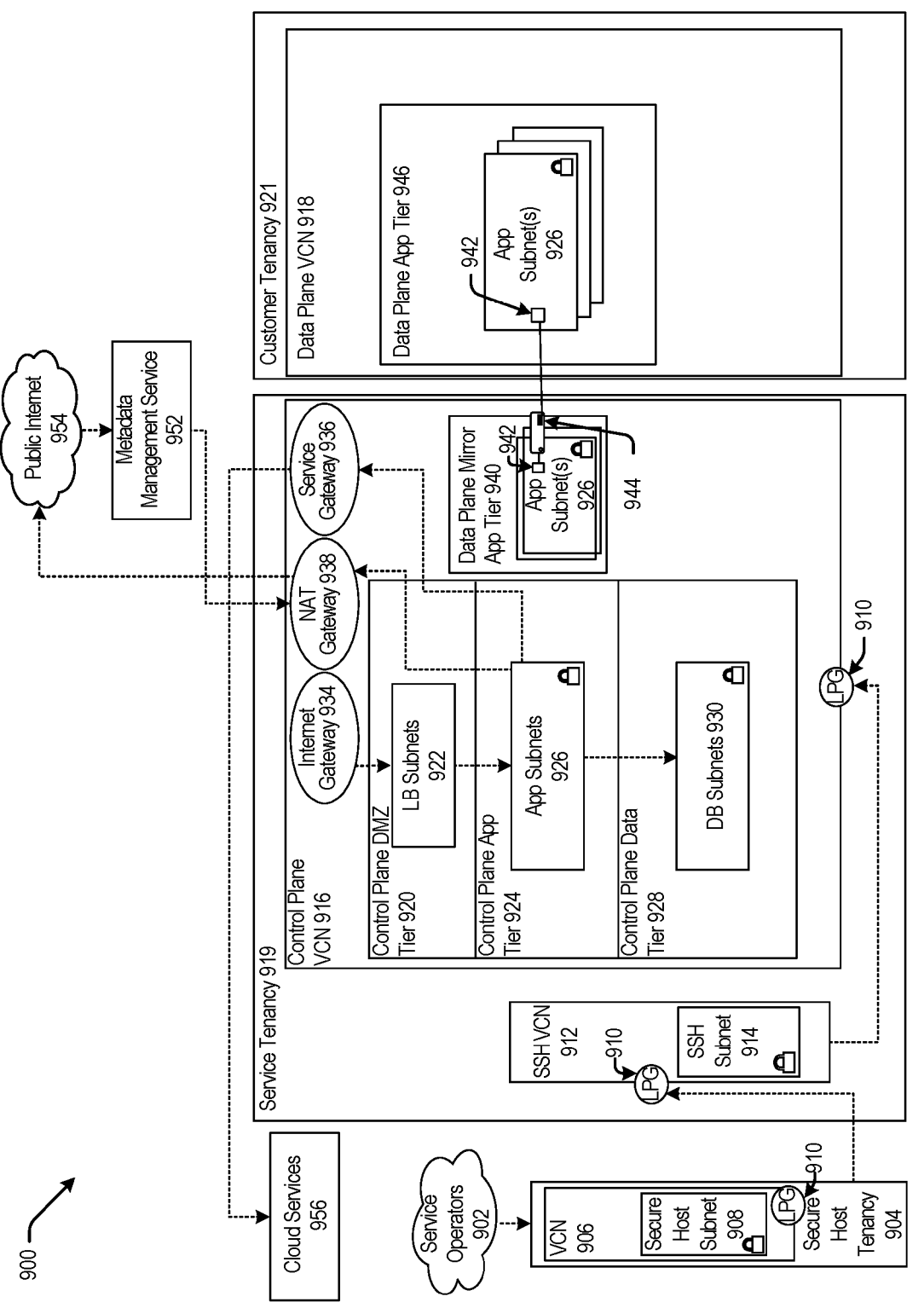
FIG. 9 is an example block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918

(e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
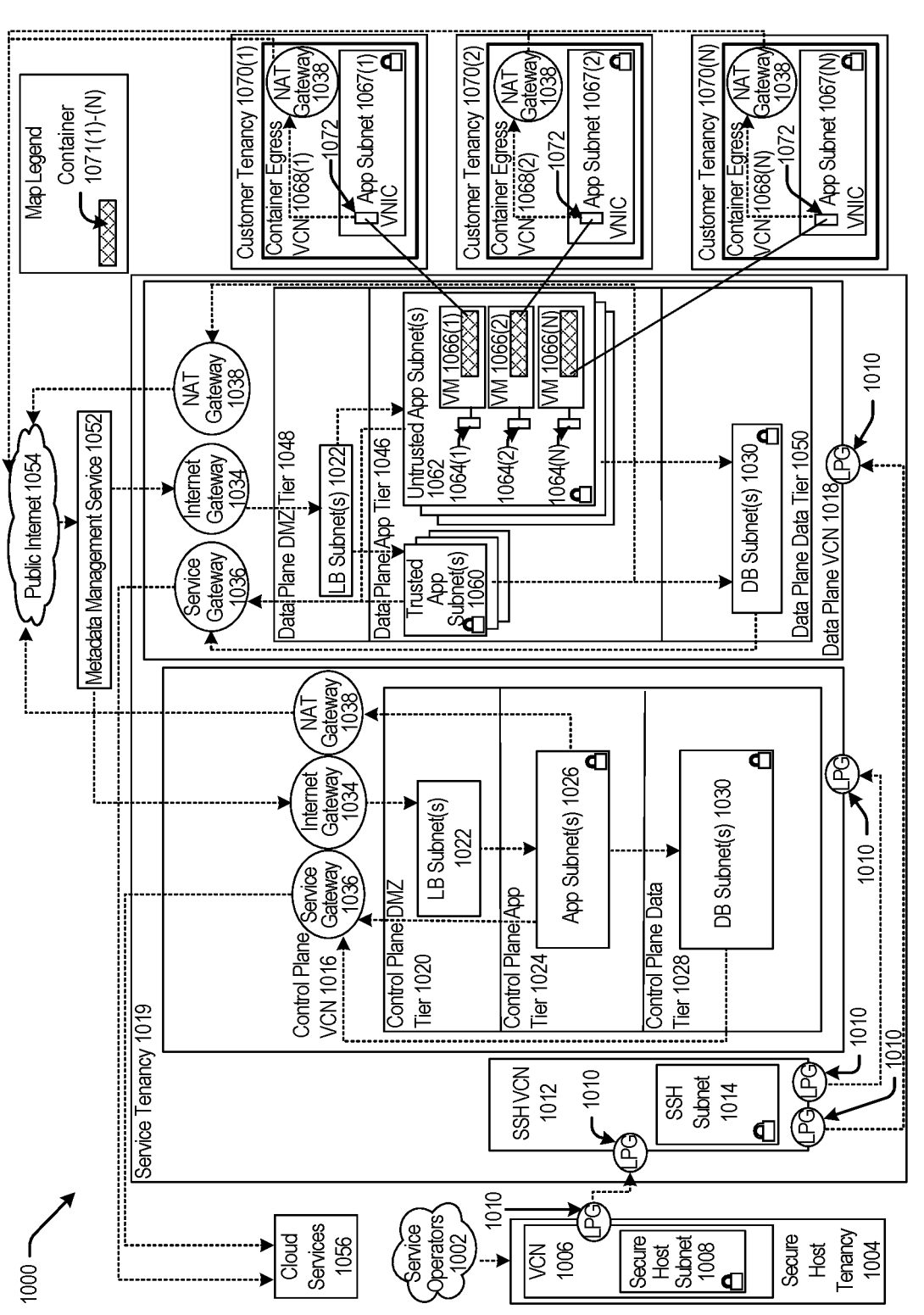
FIG. 10 is an example block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
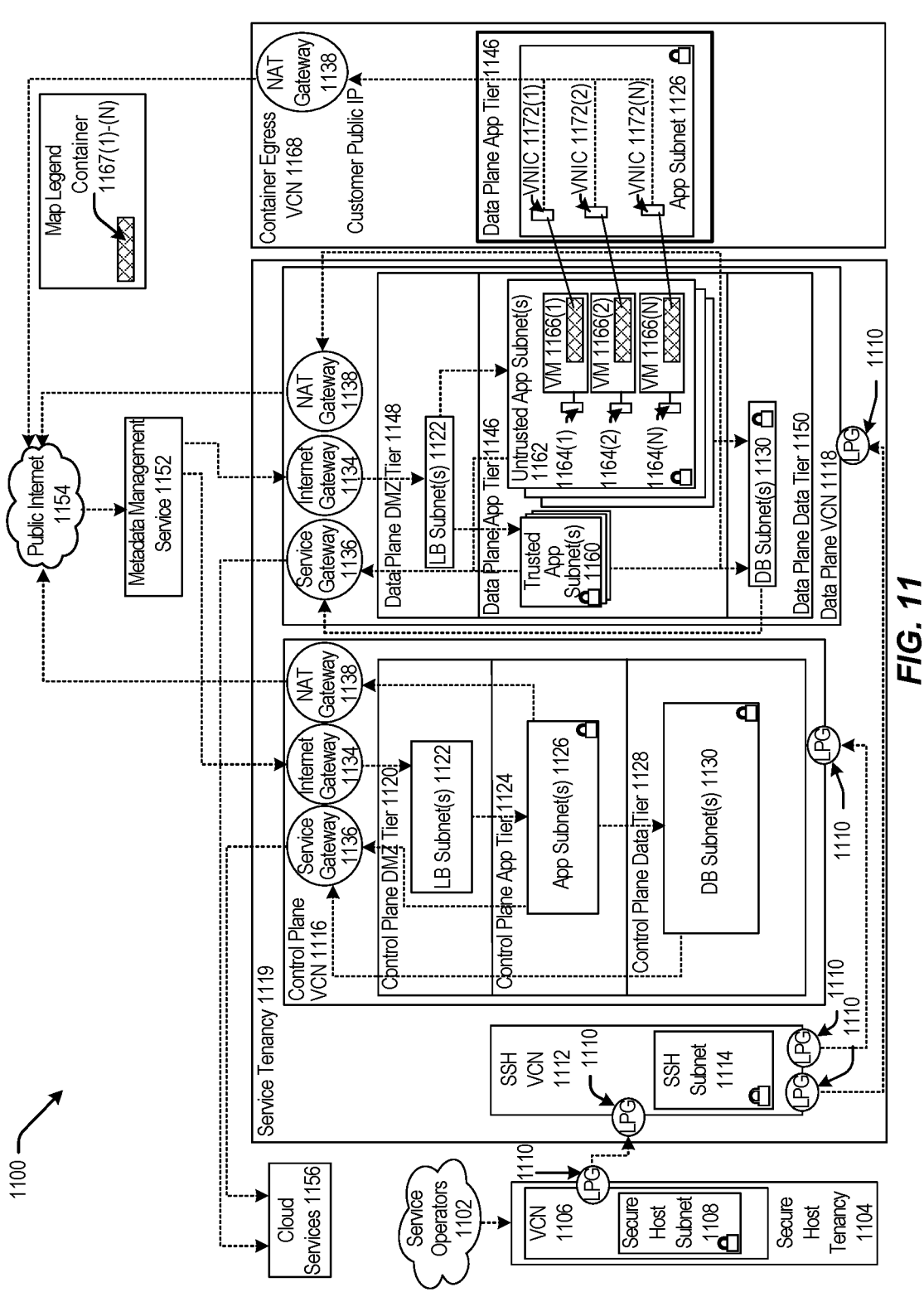
FIG. 11 is an example block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN)

1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
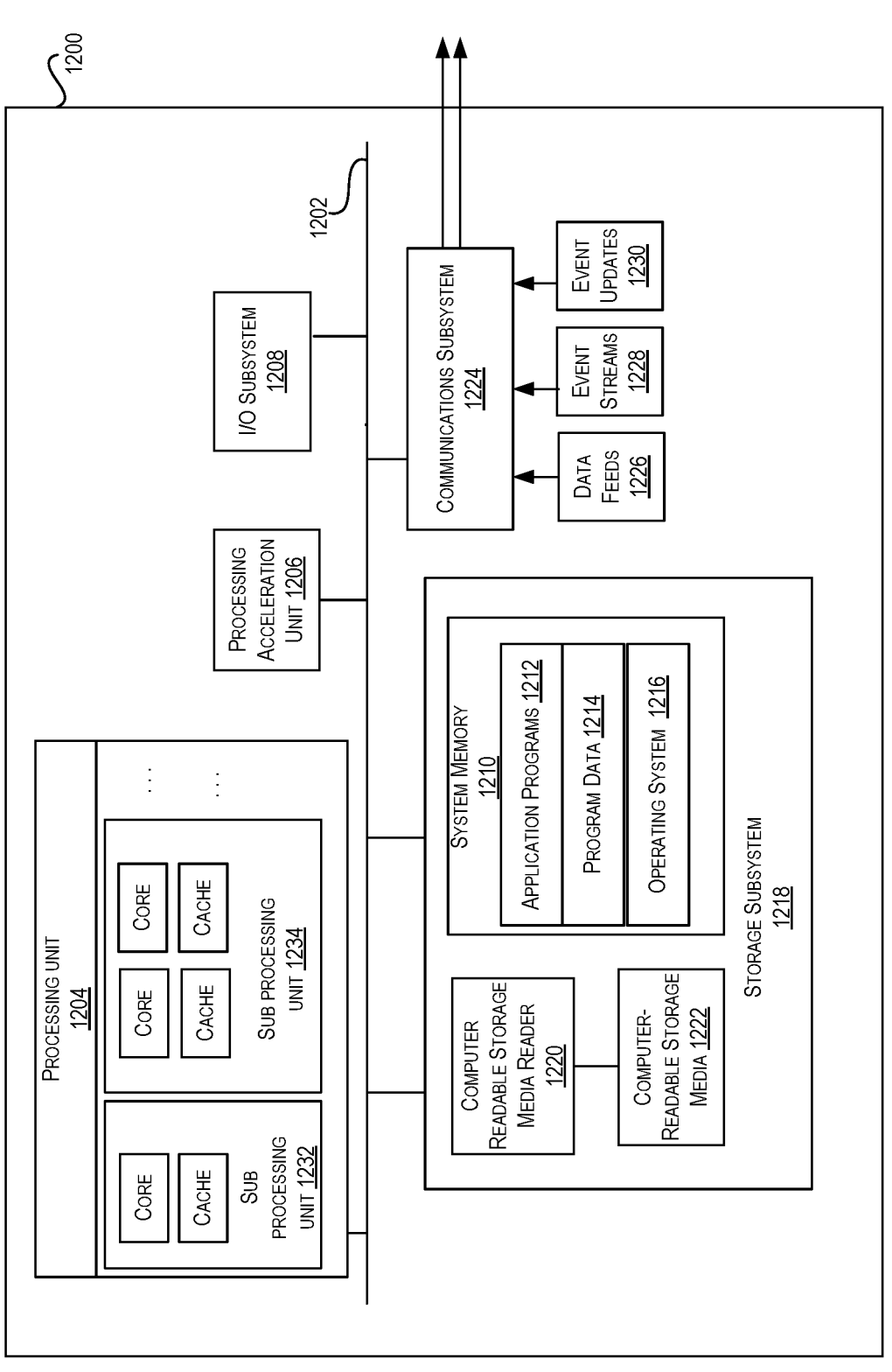
FIG. 12 is an example block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

identifying, by a computing system, text in a visually rich document;

determining, by the computing system, a sequence for the identified text, the sequence comprising a numerical order for each word of the identified text;

selecting, by the computing system, a pretrained language model based at least in part on the identified text, the determined sequence, and a domain of the identified text;

assigning, by the computing system, each word of the identified text to a respective token using the pretrained language model and the determined sequence to generate textual features corresponding to the identified text, each respective token comprising a string of one or more words;

extracting, by the computing system, visual features corresponding to the identified text, the visual features comprising information about a plurality of pixels representing each word of the identified text;

determining, by the computing system, positional features for each word of the identified text, the positional features comprising respective coordinates within the visually rich document for each word of the identified text, the respective coordinates for a word being coordinates corresponding to a position of the word or coordinates corresponding to a region of the visually rich document that contains the word;

fusing, by the computing system, the textual features and the visual features to generate fused features;

generating, by the computing system, a document model representing the visually rich document by assigning the positional features and the fused features to nodes in the document model, each node in the document model representing the fused features and the positional features of a respective word of the identified text;

training, by the computing system, a classifier to classify each respective word of the identified text, the classifier being trained on the document model representing the visually rich document; and classifying, by the computing system, the respective word of the identified text with the classifier.

2. The method of claim 1, wherein the respective word is classified as a key or a value of a key value pair.

3. The method of claim 1, wherein the document model is a graph neural network.

4. The method of claim 1, wherein the domain comprises a language or a subject matter of the identified text.

5. The method of claim 1, wherein the visually rich document comprises at least one of an invoice, a receipt, an insurance form, a boarding pass, or an identification card.

6. A non-transitory computer-readable medium storing a plurality of instructions that when executed control a computer system to perform operations comprising:

identifying, by a computing system, text in a visually rich document;

determining, by the computing system, a sequence for the identified text, the sequence comprising a numerical order for each word of the identified text;

selecting, by the computing system, a pretrained language model based at least in part on the identified text, the determined sequence, and a domain of the identified text;

assigning, by the computing system, each word of the identified text to a respective token using the pretrained language model and the determined sequence to generate textual features corresponding to the identified text, each respective token comprising a string of one or more words;

extracting, by the computing system, visual features corresponding to the identified text, the visual features comprising information about a plurality of pixels representing each word of the identified text;

determining, by the computing system, positional features for each word of the identified text, the positional features comprising respective coordinates within the visually rich document for each word of the identified text, the respective coordinates for a word being coordinates corresponding to a position of the word or coordinates corresponding to a region of the visually rich document that contains the word;

fusing, by the computing system, the textual features and the visual features to generate fused features;

generating, by the computing system, a document model representing the visually rich document by assigning the positional features and the fused features to nodes in the document model, each node in the document model representing the fused features and the positional features of a respective word of the identified text;

training, by the computing system, a classifier to classify each respective word of the identified text, the classifier being trained on the document model representing the visually rich document; and classifying, by the computing system, the respective word of the identified text with the classifier.

7. The non-transitory computer-readable medium of claim 6, wherein the respective word is classified as a key or a value of a key value pair.

8. The non-transitory computer-readable medium of claim 6, wherein the document model is a graph neural network.

9. The non-transitory computer-readable medium of claim 6, wherein the domain comprises a language or a subject matter of the identified text.

10. The non-transitory computer-readable medium of claim 6, wherein the visually rich document comprises at least one of an invoice, a receipt, an insurance form, a boarding pass, or an identification card.

11. A system comprising:

a computer-readable medium; and one or more processors for executing instructions stored on the computer-readable medium to at least perform operations comprising:

identifying, by a computing system, text in a visually rich document;

determining, by the computing system, a sequence for the identified text, the sequence comprising a numerical order for each word of the identified text;

selecting, by the computing system, a pretrained language model based at least in part on the identified text, the determined sequence, and a domain of the identified text;

assigning, by the computing system, each word of the identified text to a respective token using the pretrained language model and the determined sequence to generate textual features corresponding to the identified text, each respective token comprising a string of one or more words;

extracting, by the computing system, visual features corresponding to the identified text, the visual features comprising information about a plurality of pixels representing each word of the identified text;

determining, by the computing system, positional features for each word of the identified text, the positional features comprising respective coordinates within the visually rich document for each word of the identified text, the respective coordinates for a word being coordinates corresponding to a position of the word or coordinates corresponding to a region of the visually rich document that contains the word;

fusing, by the computing system, the textual features and the visual features to generate fused features, generating, by the computing system, a graph representing the visually rich document by assigning the positional features and the fused features to nodes in the document model, each node in the graph representing the fused features and the positional features of a respective word of the identified text;

training, by the computing system, a classifier to classify each respective word of the identified text, the classifier being trained on the graph representing the visually rich document; and classifying, by the computing system, the respective word of the identified text with the classifier.

12. The system of claim 11, wherein the respective word is classified as a key or a value of a key value pair.

13. The system of claim 11, wherein the graph is a graph neural network.

14. The system of claim 11, wherein the domain comprises a language or a subject matter of the identified text.

* * * * *